(12) United States Patent
Olmos et al.

(10) Patent No.: US 8,432,214 B2
(45) Date of Patent: Apr. 30, 2013

(54) PROGRAMMABLE TEMPERATURE SENSING CIRCUIT FOR AN INTEGRATED CIRCUIT

(75) Inventors: Alfredo Olmos, Austin, TX (US); Stefano Pietri, Austin, TX (US); Ricardo P. Coimbra, Campinas (BR)

(73) Assignee: Freescale Semiconductor, Inc., Austin, TX (US)

( * ) Notice: Subject to any disclaimer, the term of this patent is extended or adjusted under 35 U.S.C. 154(b) by 168 days.

(21) Appl. No.: 13/052,891

(22) Filed: Mar. 21, 2011

(65) Prior Publication Data
US 2012/0242398 A1   Sep. 27, 2012

(51) Int. Cl.
*H01L 35/00* (2006.01)
(52) U.S. Cl.
USPC .......................................... 327/512
(58) Field of Classification Search .................. 327/512, 327/513, 539
See application file for complete search history.

(56) References Cited

U.S. PATENT DOCUMENTS

| | | | |
|---|---|---|---|
| 4,854,731 A | 8/1989 | Jenkins | |
| 5,781,075 A | 7/1998 | Bolton, Jr. et al. | |
| 5,796,290 A | 8/1998 | Takahashi | |
| 5,980,106 A | 11/1999 | Yamamoto et al. | |
| 6,674,185 B2 * | 1/2004 | Mizuta | 307/651 |
| 6,816,351 B1 | 11/2004 | Frank et al. | |
| 6,847,254 B2 | 1/2005 | Pai | |
| 6,882,213 B2 | 4/2005 | Kim | |
| 7,579,898 B2 | 8/2009 | Soldera et al. | |
| 7,880,528 B2 * | 2/2011 | Igarashi | 327/512 |
| 7,977,999 B2 * | 7/2011 | Igarashi et al. | 327/512 |
| 2003/0201816 A1 | 10/2003 | Dotson | |
| 2005/0038625 A1 | 2/2005 | Ravatin et al. | |
| 2005/0046463 A1 | 3/2005 | Throngnumchai et al. | |
| 2005/0264971 A1 | 12/2005 | Morino | |
| 2011/0001546 A1 | 1/2011 | Guo et al. | |

OTHER PUBLICATIONS

Camacho-Galeano, E.M., et al., "Temperature Performance of Sub-1V Ultra-Low Power Current Sources", Department of Electrical Engineering, IEEE, 2008, pp. 2230-2233.

Nagel, M.H., et al., "Integrated 1V Thermal Shutdown Circuit", Electronics Letters, vol. 28, Issue 10, May 1992, pp. 969-970.

* cited by examiner

Primary Examiner — Jeffrey Zweizig
(74) Attorney, Agent, or Firm — Daniel D. Hill

(57) ABSTRACT

A programmable temperature sensing circuit includes a comparator, first and second CTAT sensing elements, first and second PTAT reference circuits, and a selection circuit. When a selection signal is a first logic state, an output terminal of the first PTAT reference circuit is coupled to the second CTAT temperature sensing element for providing a first threshold voltage to the second input of the comparator. When the selection signal is a second logic state different from the first logic state, a series-connection of the first PTAT reference circuit and the second PTAT reference circuit are coupled to the second CTAT temperature sensing element for providing a second threshold voltage to the second input of the comparator. The comparator provides an output voltage indication when a voltage provided by the first CTAT sensing element compares favorably with the selected one of the first or second threshold voltages.

20 Claims, 2 Drawing Sheets

PROGRAMMABLE TEMPERATURE SENSING CIRCUIT FOR AN INTEGRATED CIRCUIT

BACKGROUND

1. Field

This disclosure relates generally to integrated circuits, and more specifically, to a programmable temperature sensing circuit an integrated circuit.

2. Related Art

Temperature sensors are used in many applications. One way a temperature sensor is used is to control the operation of an integrated circuit when the temperature of the integrated circuit exceeds one or more predetermined threshold temperatures. Also, it may be important in some integrated circuit applications for the temperature sensor to have more than one temperature trip point, or threshold, and to sense the temperature accurately even when the power supply voltage varies. For example, if the temperature sensor senses a low temperature, a clock frequency of the integrated circuit may be increased to improve performance. On the other hand, if the temperature sensor senses a high temperature, the temperature sensor may cause the clock frequency to be decreased until the temperature is lowered. In battery powered applications, it is important for the temperature sensor to have low power consumption to conserve battery power.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
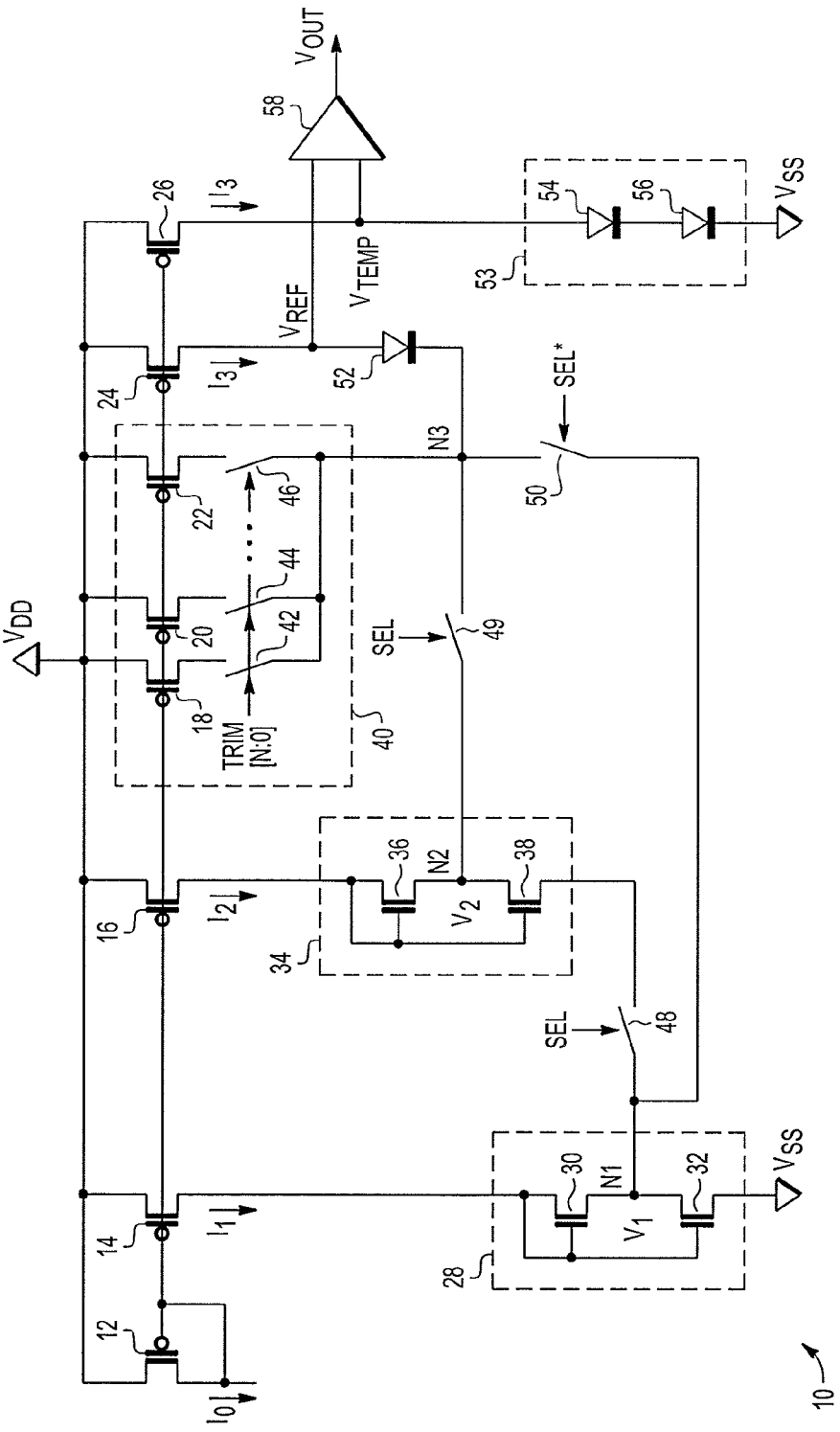
FIG. 1 illustrates, in schematic diagram form, a programmable temperature sensing circuit in accordance with one embodiment.

Generally, there is provided, a complementary metal oxide semiconductor (CMOS) temperature sensing circuit that is programmable between a low temperature threshold and a high temperature threshold. In one embodiment, the programmability feature is provided by a selection circuit for selecting between a low temperature threshold voltage and a high temperature threshold voltage. A higher number of temperature thresholds may be supported depending on each specific application. The temperature sensing circuit includes a temperature sensor having two series-connected diodes. The series-connected diodes provide a first complementary to absolute temperature (CTAT) voltage to one input of a comparator. In one embodiment, one of the two threshold voltages is provided to a second input of the comparator in response to a selection signal. Therefore, both input voltages to the comparator vary with temperature. The selection signal is asserted to provide a high temperature threshold voltage for high temperature detection by combining one proportional to absolute temperature (PTAT) voltage component with a second CTAT voltage component. The combination of a PTAT voltage with a CTAT voltage results in a threshold voltage that varies less in response to a temperature change. The low temperature threshold voltage provides low temperature detection by combining two PTAT voltage components with the second CTAT voltage component. Self-cascode MOSFETs (metal-oxide semiconductor field effect transistors) are used to provide the PTAT voltages. A trim circuit is provided for fine adjustment of the threshold voltages. A programmability feature for a number greater than two temperature thresholds can be supported by using multiple-bit selection signals associated with the necessary number of self-cascode MOSFET structures needed to generate the PTAT voltage components.

Because the temperature sensing circuit is implemented entirely in a conventional CMOS process, the temperature sensing circuit has relatively low power consumption and is area efficient. Also, the temperature sensing circuit also operates reliably at relatively low power supply voltages, that is, about 1.5 volts.

In one aspect, there is provided, a temperature sensing circuit including: a comparator having a first input, a second input, and an output; a first temperature sensing element having a first terminal coupled to the first input of the comparator, and a second terminal, the first temperature sensing element for providing a first complementary to absolute temperature (CTAT) voltage; a second temperature sensing element having a first terminal coupled to the second input of the comparator, and a second terminal, the second temperature sensing element for providing a second CTAT voltage; a first reference circuit having an output terminal for providing a first proportional to absolute temperature (PTAT) voltage; a second reference circuit having an output terminal for providing a second PTAT voltage; and a selection circuit for selectively coupling the output terminals of the first reference voltage circuit and the second reference voltage circuit to the second terminal of the second temperature sensing element in response to a selection signal, wherein when the selection signal is a first logic state, the output terminal of the first reference circuit is coupled to the second terminal of the second temperature sensing element for providing a first threshold voltage to the second input of the comparator, and when the selection signal is a second logic state different from the first logic state, a series connection of the first reference circuit and the second reference circuit are coupled to the second terminal of second temperature sensing element for providing a second threshold voltage to the second input of the comparator. The first temperature sensing element may comprise at least one diode. The second temperature sensing element may comprise a diode. The temperature sensing circuit may further comprise a current mirror circuit coupled to the first and second sensing circuits and the first and second reference circuits. The first reference circuit may comprise: a first transistor having a control electrode and a first current electrode coupled together, and a second current electrode; and a second transistor having a control electrode coupled to the control electrode and the first current electrode of the first transistor, a first current electrode coupled to the second current electrode of the first transistor, and a second current electrode coupled to a power supply voltage terminal. The second reference circuit may comprise: a third transistor having a control electrode and a first current electrode coupled together, and a second current electrode; and a fourth transistor having a control electrode coupled to the control electrode of the third transistor, and a first current electrode coupled to the second current electrode of the third transistor, and a second current electrode. The selection circuit may comprise: a first switch having a first terminal coupled to the first current electrode of the second transistor, and a second terminal coupled to the second current electrode of the fourth transistor; a second switch having a first terminal coupled to the first current electrode of the fourth transistor, and a second terminal coupled to the second terminal of the second temperature sensing element, wherein the first and second switches are responsive to the selection signal; and a third switch having a first terminal coupled to the second terminal of the second temperature sensing element, and a second terminal coupled to the first current electrode of the second transistor, wherein the third switch is responsive to a logical complement of the selection signal. The temperature sensing circuit may further comprise a trimming circuit for adjusting the first and second threshold voltages in response to a trim signal, the trimming circuit coupled between a power supply terminal and the second terminal of the second temperature sensing element. The trimming circuit may comprise a plurality of parallel-connected switchable current sources.

In another aspect, there is provided, a temperature sensing circuit comprising: a comparator having a first input terminal, a second input terminal, and an output terminal; a first complementary to absolute temperature (CTAT) sensing element having a first terminal coupled to the first input of the comparator, and a second terminal, the first temperature sensing element for providing a first CTAT voltage; a second CTAT sensing element having a first terminal coupled to the second input of the comparator, and a second terminal, the second temperature sensing element for providing a second CTAT voltage; a first proportional to absolute temperature (PTAT) reference circuit having an output terminal for providing a first PTAT voltage; a second PTAT reference circuit having an output terminal for providing a second PTAT voltage; and a selection circuit for selectively coupling the output terminals of the first PTAT reference circuit and the second PTAT reference circuit to the second terminal of the second CTAT sensing element in response to a selection signal, wherein, in response to the selection signal being a first logic state, a first threshold voltage is provided to the second input terminal of the comparator, the first threshold voltage comprising a combination of the second CTAT voltage and the first PTAT voltage, and in response to the selection signal being a second logic state different from the first logic state, a second threshold voltage is provided to the second input terminal of the comparator, the second threshold voltage comprising a combination of the second CTAT voltage, the first PTAT voltage, and the second PTAT voltage. The first CTAT sensing element may comprise at least one diode. The first CTAT sensing element may comprise two series-connected diodes. The first PTAT reference circuit may comprise: a first transistor having a first current electrode and a control electrode coupled together, and a second current electrode; and a second transistor having a first current electrode coupled to the second current electrode of the first transistor, a control electrode coupled to the control electrode of the first transistor, and a second current electrode. The temperature sensing circuit may further comprise a current mirror circuit for providing a current source for each of the first and second CTAT sensing elements and the first and second PTAT reference circuits. The temperature sensing circuit may further comprise a trimming circuit for adjusting the first and second threshold voltages in response to a trim signal, the trimming circuit coupled between a power supply terminal and the second terminal of the second CTAT sensing element. The trimming circuit may comprise a plurality of parallel-connected switchable current sources. The first threshold voltage may be a high temperature threshold voltage and the second threshold voltage may be a low temperature threshold voltage.

In yet another aspect, there is provided, a temperature sensing circuit comprising: a comparator having a first input terminal, a second input terminal, and an output terminal; a first current source having a first terminal coupled to a first power supply voltage terminal, and a second terminal coupled to the first input terminal of the comparator; a first complementary to absolute temperature (CTAT) sensing element having a first terminal coupled to the first input of the comparator, and a second terminal coupled to a second power supply voltage terminal, the first temperature sensing element for providing a first CTAT voltage; a second current source having a first terminal coupled to the first power supply voltage terminal, and a second terminal coupled to the second input terminal of the comparator; a second CTAT sensing element having a first terminal coupled to the second input of the comparator, and a second terminal, the second temperature sensing element for providing a second CTAT voltage; a third current source having a first terminal coupled to the first power supply voltage terminal, and a second terminal; a first proportional to absolute temperature (PTAT) reference circuit having a first terminal coupled to the second terminal of the third current source, a second terminal for providing a first PTAT voltage, and a third terminal coupled to the second power supply voltage terminal; a fourth current source having a first terminal coupled to the first power supply voltage terminal, and a second terminal; a second PTAT reference circuit having a first terminal coupled to the second terminal of the fourth current source, a second terminal for providing a second PTAT voltage, and a third terminal; and a selection circuit comprising: a first switch having a first terminal coupled to the second terminal of the first PTAT reference circuit, a second terminal for receiving a first selection signal, and a third terminal coupled to the third terminal of the second PTAT reference circuit; a second switch having a first terminal coupled to the second terminal of the second PTAT reference circuit, a second terminal for receiving the first selection signal, and a third terminal coupled to the second terminal of the second CTAT sensing element; and a third switch having a first terminal coupled to the second terminal of the second CTAT sensing element, a second terminal for receiving a second selection signal, and a third terminal coupled to the second terminal of the first PTAT reference circuit, wherein the second selection signal is a logical complement of the first selection signal. The first and second CTAT sensing elements may each comprise a diode. The first and second PTAT reference circuits may each comprise: a first transistor having a first current electrode and a control electrode coupled together, and a second current electrode; and a second transistor having a first current electrode coupled to the second current electrode of the first transistor, a control electrode coupled to the control electrode of the first transistor, and a second current electrode.

The output of the comparator can be used to provide a signal indicating when the sensed temperature exceeds the selected one of the high or low temperature threshold voltages. The temperature sensing circuit is implemented using a conventional CMOS process technology, has relatively low power consumption, and low sensing variation with power supply voltage.

As used herein the term metal-oxide-semiconductor and the abbreviation MOS are to be interpreted broadly, in particular, it should be understood that they are not limited merely to structures that use "metal" and "oxide" but may employ any type of conductor including "metal" and any type of dielectric including "oxide". The term field effect transistor is abbreviated as "FET".

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterisk (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

FIG. 1 illustrates, in schematic diagram form, programmable temperature sensing circuit 10 in accordance with an embodiment. Temperature sensing circuit 10 includes P-channel transistors 12, 14, 16, 18, 20, 22, 24, and 26, PTAT reference circuits 28 and 34, switches 42, 44, 46, 48, 49, and 50, diodes 52, 54, and 56, and comparator 58. A first CTAT temperature sensing element 53 includes diodes 54 and 56, and a second CTAT temperature sensing element includes diode 52. PTAT reference circuit 28 includes N-channel transistors 30 and 32. PTAT reference circuit 34 includes N-channel transistors 36 and 38. P-channel transistors 12, 14, 16, 18, 20, 22, 24, and 26 are connected together to form a current mirror circuit. Trimming circuit 40 includes P-channel transistors 18, 20, and 22 and switches 42, 44, and 46.

P-channel transistor 12 has a source (current electrode) connected to a power supply voltage terminal labeled "$V_{DD}$", and a gate (control electrode) and a drain (current electrode) connected together for providing a reference current labeled "$I_0$". Current It$_0$ is mirrored by each of P-channel transistors 14, 16, 18, 20, 22, 24, and 26. For example, P-channel transistor 14 functions as a current source and provides a mirrored current labeled "$I_1$" to PTAT reference circuit 28. The amount of current mirrored depends on the size of transistor 14 relative to transistor 12. Depending on the relative dimensions of transistors 12 and 14, current $I_1$ may be the same as, or different than, $I_0$. Transistor 14 has a source connected to VDD, a gate connected to the gate of transistor 12, and a drain. PTAT reference circuits 28 and 34 are commonly referred to as self-cascode MOSFET structures. In another embodiment, a different PTAT reference circuit may be used. In PTAT reference circuit 28, N-channel transistor 30 has a gate and a drain both connected to the drain of transistor 14, and a source. N-channel transistor 32 has a drain connected to the source of transistor 30 at node N1, a gate connected to the gate of transistor 30, and a source connected to a power supply voltage terminal labeled "$V_{SS}$". Note that in the illustrated embodiment, power supply voltage terminal $V_{DD}$ receives a positive power supply voltage and power supply voltage terminal $V_{SS}$ is coupled to ground. In another embodiment, the power supply voltages may be different. A PTAT reference voltage labeled "$V_1$" is provided at node N1 between transistors 30 and 32. P-channel transistor 16 functions as a current source and has a source connected to $V_{DD}$, a gate connected to the gate of transistor 12, and a drain for providing a current labeled "$I_2$". In PTAT reference circuit 34, N-channel transistor 36 has a gate and a drain both connected to the drain of P-channel transistor 16, and a source connected to a node labeled "N2" for providing a PTAT voltage labeled "$V_2$". N-channel transistor 38 has a drain connected to the source of transistor 36, a gate connected to the gate of transistor 36, and a source.

A selection circuit comprises switches 48, 49, and 50 and selection signals labeled "SEL" and "SEL*". In response to selection signals SEL and SEL*, voltage VREF is switched between a low threshold voltage and a high threshold voltage. Selection signals SEL and SEL* may be provided by a circuit using temperature sensing circuit 10, for example, a data processor such as a microprocessor or a digital signal processor (DSP). Switch 48 has a first terminal connected to the drain of transistor 32, a second terminal connected to the source of transistor 38, and a control terminal for receiving selection signal SEL. Switch 49 has a first terminal connected to the source of transistor 36, a second terminal connected to node N3, and a control terminal for receiving selection signal SEL. Switch 50 has a first terminal connected to node N1, a second terminal connected to node N3, and a control terminal for receiving selection signal SEL*. In the illustrated embodiment, selection signal SEL* is a logical complement of selection signal SEL. Each switch in circuit 10 can be implemented using one or more MOS transistors. In another embodiment, the selection circuit may comprise a different circuit, such as for example, a multiplexer or a combination of logic gates.

Trimming circuit 40 includes a plurality of selectable current sources, and provides mirrored currents as discussed above regarding the other P-channel transistors. In the illustrated embodiment, each selectable current source includes a P-channel transistor connected in series with a switch. Trimming circuit 40 includes three representative selectable current sources. The amount of current sourced to node N3 can be adjusted by selecting the number of current sources connected to node N3 using switches 42, 44, and 46. In trimming circuit 40, P-channel transistor 18 has a source connected to VDD, a gate connected to the gate of transistor 12, and a drain. Switch 42 has a first terminal connected to the drain of transistor 18, a control terminal for receiving one bit of a multi-bit control signal labeled "TRIM [N:0]", where N can be any integer, and a second terminal connected to node N3. In one embodiment, the number of selectable current sources is eight, that is, N equals 7. In another embodiment, there can be any number of selectable current sources. P-channel transistor 20 has a source connected to $V_{DD}$, a gate connected to the gate of transistor 12, and a drain. Switch 44 has a first terminal connected to the drain of transistor 20, a control terminal for receiving one bit of control signal TRIM [N:0], and a second terminal connected to node N3. P-channel transistor 22 has a source connected to $V_{DD}$, a gate connected to the gate of transistor 12, and a drain. Switch 46 has a first terminal connected to the drain of transistor 22, a control terminal for receiving one bit of control signal TRIM [N:0], and a second terminal connected to node N3. In one embodiment, each of the switchable current sources provides the same current. In another embodiment, the amount of current provided by each switchable current source may have, for example, a binary weighting.

Current source 24 has a source connected to $V_{DD}$, a gate connected to the gate of transistor 12, and a drain for providing a current labeled "$I_3$". A CTAT sensing element 52 is connected between the drain of transistor 24 and node N3. In one embodiment, CTAT sensing element 52 is a diode having a first terminal (anode) connected to the drain of transistor 24, and a second terminal (cathode) connected to node N3. In another embodiment, CTAT sensing element 52 may be one or more of a different type of temperature sensing element, such as for example, a bipolar transistor. Current source 26 has a source connected to $V_{DD}$, a gate connected to the gate of transistor 12, and a drain for providing a current labeled "$I_3$". In the illustrated embodiment, current sources 24 and 26 provide the same current ($I_3$). However, in another embodiment, current source 26 may provide a different current from $I_3$, such as for example, a multiple of current $I_3$. A CTAT sensing element 53 is connected between the drain of transistor 26 and $V_{SS}$. A voltage drop across CTAT sensing element 53 is labeled "$V_{TEMP}$". In one embodiment, CTAT sensing element 53 is a pair of series-connected diodes 54 and 56. Diode 54 has an anode connected to the drain of transistor 26, and a cathode. Diode 56 has an anode connected to the cathode of diode 54, and a cathode connected to $V_{SS}$. In another embodiment, CTAT sensing element 53 may include one or more of a different type of temperature sensing element, such as for example, a bipolar transistor. Comparator 58 has a first input connected to the drain of transistor 24 for receiving a reference voltage labeled "$V_{REF}$", a second input connected to the anode of diode 54 for receiving voltage $V_{TEMP}$, and an output for providing an output voltage labeled "$V_{OUT}$". Note that reference voltage $V_{REF}$ also changes with respect to temperature.

In operation, temperature sensing circuit 10 senses when a voltage provided by a temperature sensing element crosses one of two predetermined selectable threshold voltages (VTH) and provides an output voltage in response. The threshold voltages can be trimmed, or adjusted, for relatively fine tuning of the threshold voltages of temperature sensing circuit 10. The threshold voltages are tuned by changing the amount of current provided to node N3, thus changing the voltages of $V_1$ and $V_2$. Separate multi-bit values for the TRIM [N:0] signal can be associated with selection signals SEL and SEL* and used to trim the high and low threshold voltages differently.

P-channel transistors 12, 14, 16, 24, and 26 work in a strong inversion operating mode. Transistors 24 and 26 both provide the same current ($I_3$) in the illustrated embodiment. In one operating mode, the high temperature threshold voltage is selected to provide voltage $V_{REF}$ by asserting selection signal SEL as a logic low voltage and asserting selection signal SEL* as a logic high voltage. Switches 48 and 49 are open, or substantially non-conductive, and switch 50 is closed, or conductive. High temperature reference voltage $V_{REF}$ is equal to the voltage drop across diode 52 ($V_D$) plus voltage $V_1$ ($V_{REF}=V_1+V_D$). Voltage $V_1$ is a PTAT voltage and voltage $V_D$ is a CTAT voltage. Because the CTAT diode voltage $V_D$ varies in a complementary manner to temperature, and the PTAT voltage $V_1$ varies proportionally to temperature, the CTAT and PTAT voltages effectively cancel each other out, so that reference voltage $V_{REF}$ will only vary a small amount as compared to CTAT voltage $V_{TEMP}$. When voltage $V_{TEMP}$ is greater than reference voltage $V_{REF}$, comparator 58 provides a logic high output voltage $V_{OUT}$. When voltage $V_{TEMP}$ is lower than reference voltage $V_{REF}$, comparator 58 provides a logic low output voltage $V_{OUT}$. In one embodiment, a comparator with hysteresis can be used. Trimming circuit 40 can be used to provide an additional voltage adjustment for voltage $V_{REF}$. The specific amount voltage $V_{REF}$ is trimmed is determined by the relative sizes of transistors 18, 20, and 22 to transistor 12 and how many and which ones of transistors 18, 20, and 22 are made conductive.

The low temperature threshold voltage is selected by asserting selection signal SEL as a logic high voltage and selection signal SEL* as a logic low voltage. Switches 48 and 49 are closed and switch 50 is open. In this mode, low temperature reference voltage $V_{REF}$ is equal to the voltage drop across diode 52 ($V_D$) plus voltages $V_1$ and $V_2$ ($V_{REF}=V_1+V_2+V_D$). Both of voltages $V_1$ and $V_2$ are PTAT voltages and $V_D$ is a CTAT voltage. Because two series-connected PTAT voltages are added to one CTAT voltage, low temperature reference voltage $V_{REF}$ may vary more, or less, than the high temperature reference voltage described above, but at least less than $V_{TEMP}$. Note that the CTAT and PTAT voltages of temperature sensing circuit 10 depend on various factors, such as for example, transistor size, current mirror ratios, etc.

As discussed above, temperature sensing circuit 10 can be programmed to provide either a low temperature indication or a relatively higher temperature indication. By providing two or more different trimmable threshold voltages to select between, temperature sensing circuit 10 is programmable and may be used in more applications, thus saving the cost of designing and manufacturing multiple temperature sensing circuits. Also, temperature sensing circuit 10 has relatively low power consumption and can be manufactured using a conventional CMOS process.

Figure 2:
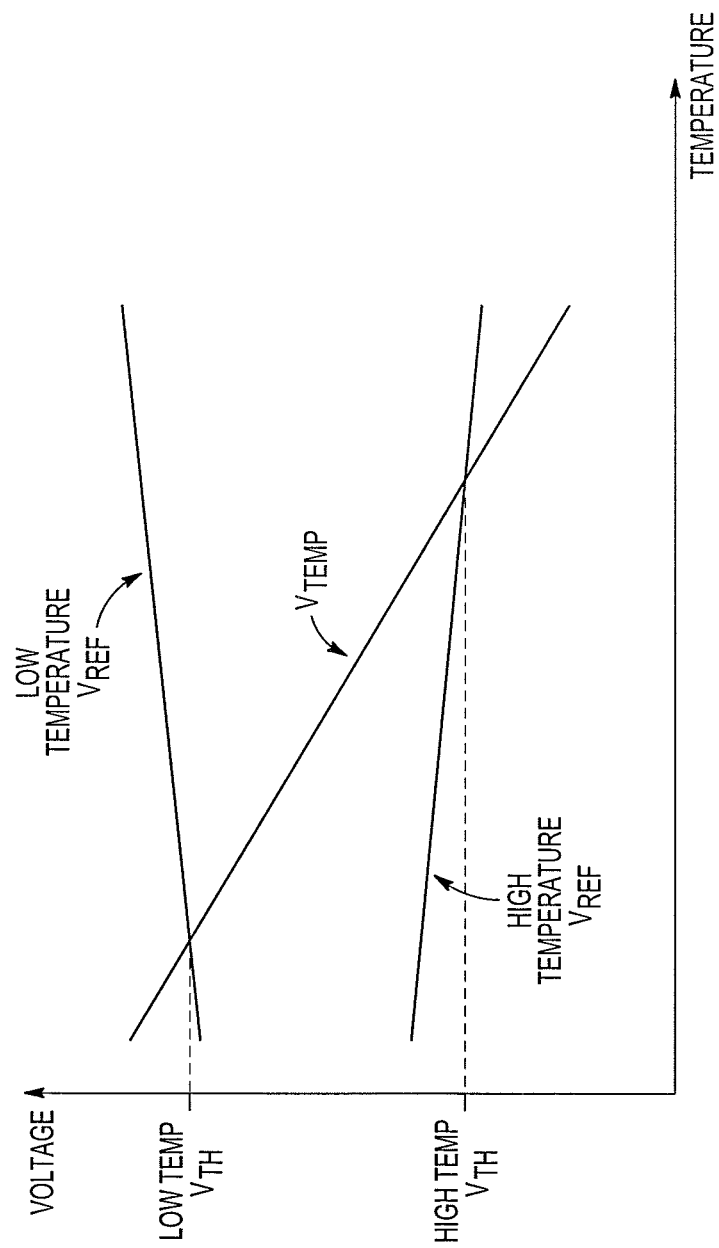
FIG. 2 illustrates a graph of voltage versus temperature for several voltages in the programmable temperature sensing circuit of FIG. 1.

FIG. 2 illustrates a graph of voltage versus temperature for several voltages in the programmable temperature sensor of FIG. 1. CTAT voltage $V_{TEMP}$ decreases with increasing temperature. High temperature voltage $V_{REF}$ decreases a relatively small amount with increasing temperature because the high temperature voltage $V_{REF}$ is a combination of a PTAT voltage drop and a CTAT voltage drop. Because the low temperature voltage $V_{REF}$ is a combination of two PTAT voltages and one CTAT voltage, the low temperature voltage $V_{REF}$ changes more with respect to temperature. The point in FIG. 2 where the low temperature voltage $V_{REF}$ and voltage $V_{TEMP}$ cross is the low temperature threshold voltage ($V_{TH}$). The point in FIG. 2 where the high temperature voltage $V_{REF}$ and voltage $V_{TEMP}$ cross is the high temperature threshold voltage ($V_{TH}$). Note that the voltage curves are linear in FIG. 2 for the purposes of simplicity and clarity. In an actual implementation the voltage curves may not be linear. Also, note that in another embodiment, the high temperature $V_{REF}$ may have a positive slope and the low temperature $V_{REF}$ may have a negative slope.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A temperature sensing circuit comprising:
   a comparator having a first input, a second input, and an output;
   a first temperature sensing element having a first terminal coupled to the first input of the comparator, and a second terminal, the first temperature sensing element for providing a first complementary to absolute temperature (CTAT) voltage;
   a second temperature sensing element having a first terminal coupled to the second input of the comparator, and a second terminal, the second temperature sensing element for providing a second CTAT voltage;
   a first reference circuit having an output terminal for providing a first proportional to absolute temperature (PTAT) voltage;
   a second reference circuit having an output terminal for providing a second PTAT voltage; and
   a selection circuit for selectively coupling the output terminals of the first reference voltage circuit and the second reference voltage circuit to the second terminal of the second temperature sensing element in response to a selection signal,
   wherein when the selection signal is a first logic state, the output terminal of the first reference circuit is coupled to the second terminal of the second temperature sensing element for providing a first threshold voltage to the second input of the comparator, and when the selection signal is a second logic state different from the first logic state, a series connection of the first reference circuit and the second reference circuit are coupled to the second terminal of second temperature sensing element for providing a second threshold voltage to the second input of the comparator.

2. The temperature sensing circuit of claim 1, wherein the first temperature sensing element comprises at least one diode.

3. The temperature sensing circuit of claim 1, wherein the second temperature sensing element comprises a diode.

4. The temperature sensing circuit of claim 1, further comprising a current minor circuit coupled to the first and second sensing circuits and the first and second reference circuits.

5. The temperature sensing circuit of claim 1, wherein the first reference circuit comprises:
   a first transistor having a control electrode and a first current electrode coupled together, and a second current electrode; and
   a second transistor having a control electrode coupled to the control electrode of the first transistor, a first current electrode coupled to the second current electrode of the first transistor, and a second current electrode coupled to a power supply voltage terminal.

6. The temperature sensing circuit of claim 5, wherein the second reference circuit comprises:
   a third transistor having a control electrode and a first current electrode coupled together, and a second current electrode; and
   a fourth transistor having a control electrode coupled to the control electrode of the third transistor, a first current electrode coupled to the second current electrode of the third transistor, and a second current electrode.

7. The temperature sensing circuit of claim 6, wherein the selection circuit comprises:
   a first switch having a first terminal coupled to the first current electrode of the second transistor, and a second terminal coupled to the second current electrode of the fourth transistor;
   a second switch having a first terminal coupled to the first current electrode of the fourth transistor, and a second terminal coupled to the second terminal of the second temperature sensing element, wherein the first and second switches are responsive to the selection signal; and
   a third switch having a first terminal coupled to the second terminal of the second temperature sensing element, and a second terminal coupled to the first current electrode of the second transistor, wherein the third switch is responsive to a logical complement of the selection signal.

8. The temperature sensing circuit of claim 1, further comprising a trimming circuit for adjusting the first and second threshold voltages in response to a trim signal, the trimming circuit coupled between a power supply voltage terminal and the second terminal of the second temperature sensing element.

9. The temperature sensing circuit of claim 8, wherein the trimming circuit comprises a plurality of parallel-connected switchable current sources.

10. A temperature sensing circuit comprising:
    a comparator having a first input terminal, a second input terminal, and an output terminal;
    a first complementary to absolute temperature (CTAT) sensing element having a first terminal coupled to the first input of the comparator, and a second terminal, the first temperature sensing element for providing a first CTAT voltage;
    a second CTAT sensing element having a first terminal coupled to the second input of the comparator, and a second terminal, the second temperature sensing element for providing a second CTAT voltage;
    a first proportional to absolute temperature (PTAT) reference circuit having an output terminal for providing a first PTAT voltage;
    a second PTAT reference circuit having an output terminal for providing a second PTAT voltage; and
    a selection circuit for selectively coupling the output terminals of the first PTAT reference circuit and the second PTAT reference circuit to the second terminal of the second CTAT sensing element in response to a selection signal,
    wherein, in response to the selection signal being a first logic state, a first threshold voltage is provided to the second input terminal of the comparator, the first threshold voltage comprising a combination of the second CTAT voltage and the first PTAT voltage, and in response to the selection signal being a second logic state different from the first logic state, a second threshold voltage is provided to the second input terminal of the comparator, the second threshold voltage comprising a combination of the second CTAT voltage, the first PTAT voltage, and the second PTAT voltage.

11. The temperature sensing circuit of claim 10, wherein the first CTAT sensing element comprises at least one diode.

12. The temperature sensing circuit of claim 10, wherein the first CTAT sensing element comprises two series-connected diodes.

13. The temperature sensing circuit of claim 10, wherein the first PTAT reference circuit comprises:

a first transistor having a first current electrode and a control electrode coupled together, and a second current electrode; and a second transistor having a first current electrode coupled to the second current electrode of the first transistor, a control electrode coupled to the control electrode of the first transistor, and a second current electrode.

14. The temperature sensing circuit of claim 10, further comprising a current minor circuit for providing a current source for each of the first and second CTAT sensing elements and the first and second PTAT reference circuits.

15. The temperature sensing circuit of claim 10, further comprising a trimming circuit for adjusting the first and second threshold voltages in response to a trim signal, the trimming circuit coupled between a power supply terminal and the second terminal of the second CTAT sensing element.

16. The temperature sensing circuit of claim 15, wherein the trimming circuit comprises a plurality of parallel-connected switchable current sources.

17. The temperature sensing circuit of claim 10, wherein the first threshold voltage is a high temperature threshold voltage and the second threshold voltage is a low temperature threshold voltage.

18. A temperature sensing circuit comprising:

a comparator having a first input terminal, a second input terminal, and an output terminal;

a first current source having a first terminal coupled to a first power supply voltage terminal, and a second terminal coupled to the first input terminal of the comparator;

a first complementary to absolute temperature (CTAT) sensing element having a first terminal coupled to the first input of the comparator, and a second terminal coupled to a second power supply voltage terminal, the first temperature sensing element for providing a first CTAT voltage;

a second current source having a first terminal coupled to the first power supply voltage terminal, and a second terminal coupled to the second input terminal of the comparator;

a second CTAT sensing element having a first terminal coupled to the second input of the comparator, and a second terminal, the second temperature sensing element for providing a second CTAT voltage;

a third current source having a first terminal coupled to the first power supply voltage terminal, and a second terminal;

a first proportional to absolute temperature (PTAT) reference circuit having a first terminal coupled to the second terminal of the third current source, a second terminal for providing a first PTAT voltage, and a third terminal coupled to the second power supply voltage terminal;

a fourth current source having a first terminal coupled to the first power supply voltage terminal, and a second terminal;

a second PTAT reference circuit having a first terminal coupled to the second terminal of the fourth current source, a second terminal for providing a second PTAT voltage, and a third terminal; and a selection circuit comprising:

a first switch having a first terminal coupled to the second terminal of the first PTAT reference circuit, a second terminal for receiving a first selection signal, and a third terminal coupled to the third terminal of the second PTAT reference circuit;

a second switch having a first terminal coupled to the second terminal of the second PTAT reference circuit, a second terminal for receiving the first selection signal, and a third terminal coupled to the second terminal of the second CTAT sensing element; and a third switch having a first terminal coupled to the second terminal of the second CTAT sensing element, a second terminal for receiving a second selection signal, and a third terminal coupled to the second terminal of the first PTAT reference circuit, wherein the second selection signal is a logical complement of the first selection signal.

19. The temperature sensing circuit of claim 18, wherein the first and second CTAT sensing elements each comprise a diode.

20. The temperature sensing circuit of claim 18, wherein the first and second PTAT reference circuits each comprise:

a first transistor having a first current electrode and a control electrode coupled together, and a second current electrode; and a second transistor having a first current electrode coupled to the second current electrode of the first transistor, a control electrode coupled to the control electrode of the first transistor, and a second current electrode.

\* \* \* \* \*